United States Patent
Ferris et al.

(10) Patent No.: US 9,064,231 B2
(45) Date of Patent: Jun. 23, 2015

(54) CONVERTING DOCUMENTS

(75) Inventors: Ian J. Ferris, Baildon (GB); Lynn Milby, Angus (GB)

(73) Assignee: NCR Corporation, Duluth, GA (US)

( * ) Notice: Subject to any disclaimer, the term of this patent is extended or adjusted under 35 U.S.C. 154(b) by 2085 days.

(21) Appl. No.: 12/001,815

(22) Filed: Dec. 13, 2007

(65) Prior Publication Data

US 2009/0157416 A1    Jun. 18, 2009

(51) Int. Cl.
G06F 17/00    (2006.01)
G06Q 10/10    (2012.01)
G06F 17/21    (2006.01)
G06Q 40/00    (2012.01)
G07F 19/00    (2006.01)

(52) U.S. Cl.
CPC .............. G06Q 10/10 (2013.01); G07F 19/211 (2013.01); G06F 17/211 (2013.01); G06Q 40/00 (2013.01)

(58) Field of Classification Search
CPC .............................. G06F 17/211; G06F 19/211
USPC ......................................................... 715/200
See application file for complete search history.

(56) References Cited

U.S. PATENT DOCUMENTS 6,970,846 B1 * 11/2005 Drummond et al. ............ 705/43
7,310,678 B2 * 12/2007 Gunaseelan et al. .......... 709/230
2003/0020747 A1 * 1/2003 Korala ........................... 345/744
2003/0046318 A1 * 3/2003 Schohn et al. ................. 707/513
2003/0078960 A1 * 4/2003 Murren et al. ................. 709/203
2003/0215067 A1 * 11/2003 Ordille et al. ............... 379/88.13

OTHER PUBLICATIONS

CEN Workshop Agreement CWA 13449-1, "Extensions for Financial Services (XFS) interface specification—Part 1: Application Programming Interface (API)—Service Provider Interface (SPI)—Programmer's Interface" Dec. 1998, p. 1-121.*
Wikipedia, "CEN/XFS", 1 page, captured by Internet Archive Wayback Machine on Sep. 13, 2006, retrieved from http://web.archive.org/web/20060913000000/http://en.wikipedia.org/wiki/CEN/XFS.*

* cited by examiner

Primary Examiner — Amelia Tapp
(74) Attorney, Agent, or Firm — Michael Chan

(57) ABSTRACT

A method of converting a document, such as a document complying with the CEN-XFS standard for Forms. The method comprises accessing format parameters; reading information from the document; parsing the read information to detect attributes and text; identifying any detected attributes not consistent with the accessed format parameters; converting any identified attributes not consistent with the accessed format parameters into attributes consistent with the accessed format parameters; and creating a converted document in which all of the attributes conform to the accessed format parameters.

16 Claims, 5 Drawing Sheets

FIG. 2

```
                                            22
XFSFORM "enBusOpPleaseWait"
BEGIN
      SIZE 32, 16      24
      VERSION 1, 0, "4 July 2007", ""
      COPYRIGHT ""
      COMMENT ""
      TITLE ""
      LANGUAGE 25

XFSFIELD "Information1"
      BEGIN
32         SIZE 32, 1
           POSITION 0, 5                        26
34         TYPE TEXT        30
           ACCESS WRITE
           OVERFLOW TERMINATE
           STYLE NORMAL
           HORIZONTAL LEFT
36         INITIALVALUE "Please wait while accessing"
      END XFSFIELD "Information2"
      BEGIN
           SIZE 32, 1
           POSITION 0, 6
44         TYPE TEXT                            28
           ACCESS WRITE
           OVERFLOW TERMINATE
           STYLE NORMAL
           HORIZONTAL LEFT
46         INITIALVALUE "the device..."
      END
END
```

20

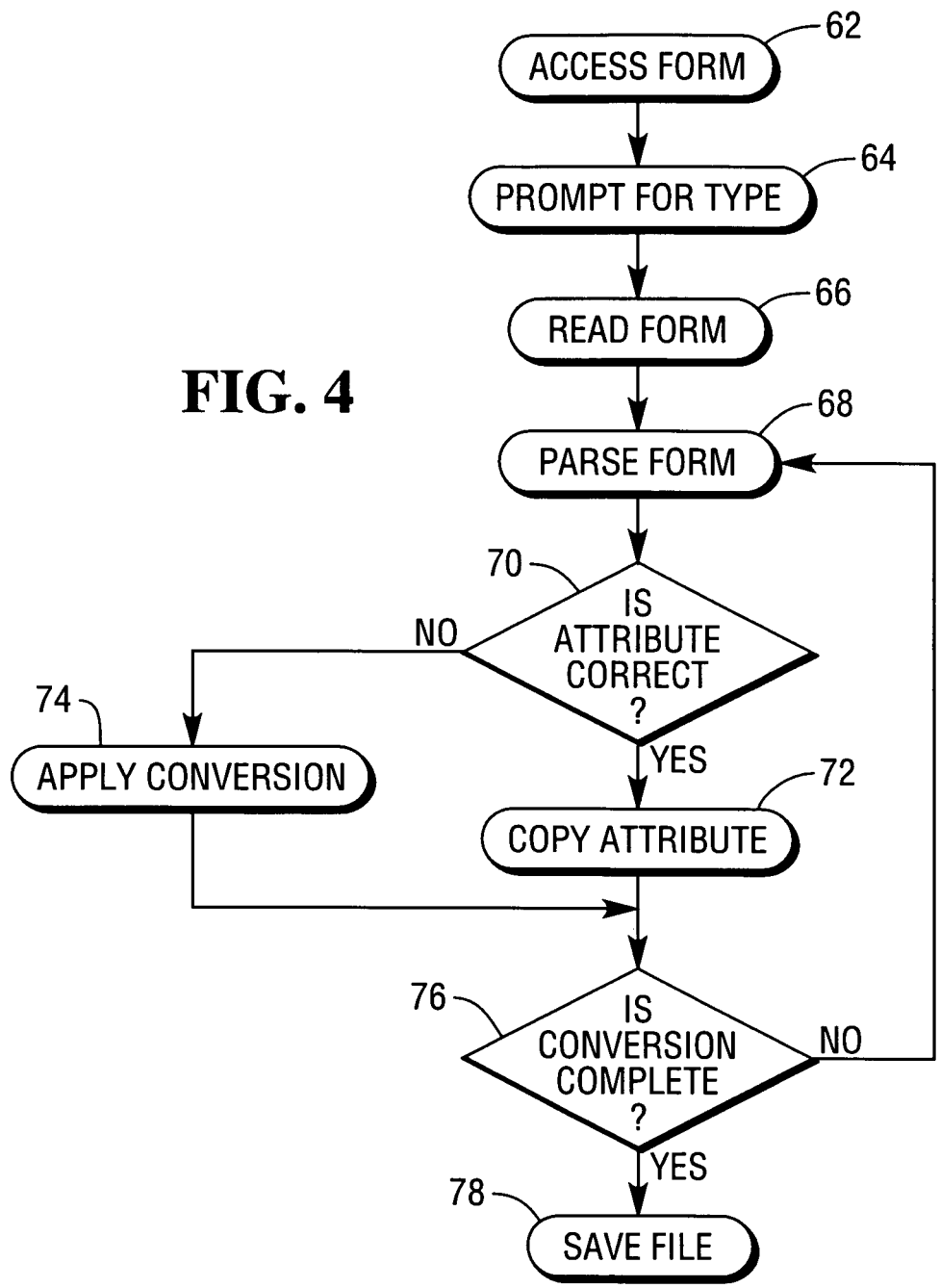

```
                                          ┌─82
        XFSFORM "enBusOpPleaseWait"
        BEGIN
              SIZE 40, 12 ────────84
              VERSION 1, 0, "4 July 2007", ""
              COPYRIGHT ""
              COMMENT ""
              TITLE ""
              LANGUAGE 25

XFSFIELD "Information1"
              BEGIN
  92─────────────SIZE 40, 1
                ┌POSITION 1, 6
                 TYPE TEXT
  94─┘           ACCESS WRITE
                 OVERFLOW TERMINATE
                 STYLE NORMAL
  98─────────    HORIZONTAL LEFT
             └──INITIALVALUE "Please wait while accessing the"
              END XFSFIELD "Information2"
              BEGIN
                    SIZE 40, 1
  96─────────────  POSITION 1, 7
                    TYPE TEXT
                    ACCESS WRITE
                    OVERFLOW TERMINATE
                    STYLE NORMAL
  99─────────       HORIZONTAL LEFT
              └────INITIALVALUE "device..."
              END
        END
```

CONVERTING DOCUMENTS

BACKGROUND

The present invention relates to converting documents; in particular, though not exclusively, the present invention relates to converting documents complying with a CEN-XFS standard.

The CEN-XFS standard is well known in the financial services field. CEN-XFS provides a common API for accessing and manipulating various devices (such as Automated Teller Machine (ATM) devices) regardless of the vendor of those devices. This allows a single application to run in a multi-vendor hardware environment, which is useful for ATMs because these typically include a plurality of devices, such as card readers and printers, which may be supplied by different vendors.

Devices in an ATM are controlled by XFS service providers, which are software components that comply with the CEN-XFS standard and that are supplied by the vendor of that device or the vendor of the ATM including that device. Each service provider provides a CEN-XFS interface that is uniform for that type of device.

An application executing on an ATM (for example, a supervisor application that supports diagnostic, maintenance, and replenishment operations) can display or print information using documents that provide text and location attributes for the display or printer. These documents, also referred to as "XFS Forms", comply with the CEN-XFS standard, see "CWA 14050—Extensions for Financial Services (XFS) interface specification—Release 3.03", in particular, "Part 3: Printer Device Class Interface", and "Part 9: Text Terminal Unit Device Class Interface". FIG. 1 shows the format of a CEN-XFS Form 10.

To display information, for example on a rear operator panel, an ATM application sends a display request and a pointer to a display document (Form). The service provider for the rear operator panel receives the request and accesses the display document. The service provider then parses the display document and renders the information contained in the display document using the attributes provided by the display document.

Although these documents comply with this XFS standard, different vendors have different interpretations of this standard. As a result, a document prepared by one vendor may not be correctly parsed by a service provider supplied by a different vendor. If the service provider cannot parse a document, the document is not displayed (or printed, in the case of a print request).

There is therefore a need to ensure compatibility between documents provided by one vendor and service providers supplied by a different vendor.

SUMMARY

According to a first aspect of the present invention, there is provided a method of converting a document, the method comprising: accessing format parameters; reading information from the document; parsing the read information to detect attributes and text; identifying any detected attributes not consistent with the accessed format parameters; converting any identified attributes not consistent with the accessed format parameters into attributes consistent with the accessed format parameters; and creating a converted document in which all of the attributes conform to the accessed format parameters.

The step of accessing format parameters may include receiving one or more parameters selected by a user via a graphical user interface. Alternatively, the step of accessing format parameters may include using predefined format parameters.

The format parameters may indicate dimensions of media on which the text is to be rendered. The media dimensions may relate to paper size, display size, or the like, and may be in the format of a number of characters wide and a number of characters high. The format parameters may relate to characteristics of a self-service device, such as a self-service display, a self-service printer, or the like.

The method may further comprise the step of saving the converted document as multiple files, each file having a filename derived from part of the original document.

The document and converted document may both conform to the CEN-XFS Forms standard.

According to second aspect of the present invention there is provided a computer program comprising program instructions for implementing all of the steps of the first aspect of the invention.

The computer program may be (i) embodied on a record medium, (ii) conveyed on an electrical carrier signal, or (iii) stored in computer memory.

According to a third aspect of the present invention, there is provided a method of converting a document complying with a first implementation of a CEN-XFS standard to a second implementation of the CEN-XFS standard, the method comprising: reading information from a document complying with the first implementation of the CEN-XFS standard; parsing the read information to ascertain text and position information; converting the position information to a format used by the second implementation of the XFS standard; and creating a new document comprising the ascertained text and the converted position information so that a service provider operating according to the second implementation is operable to render the text.

According to fourth aspect of the present invention there is provided a computer program comprising program instructions for implementing all of the steps of the third aspect of the invention.

The computer program may be (i) embodied on a record medium, (ii) conveyed on an electrical carrier signal, or (iii) stored in computer memory.

By virtue of these aspects of the invention, documents can be converted automatically, thereby saving time and reducing the scope for human error.

BRIEF DESCRIPTION OF THE DRAWINGS

To provide context for an embodiment of the present invention, some prior art documents will be described with reference to the following drawings:

FIG. 2 illustrates a document having a first format; and

Figure 6:
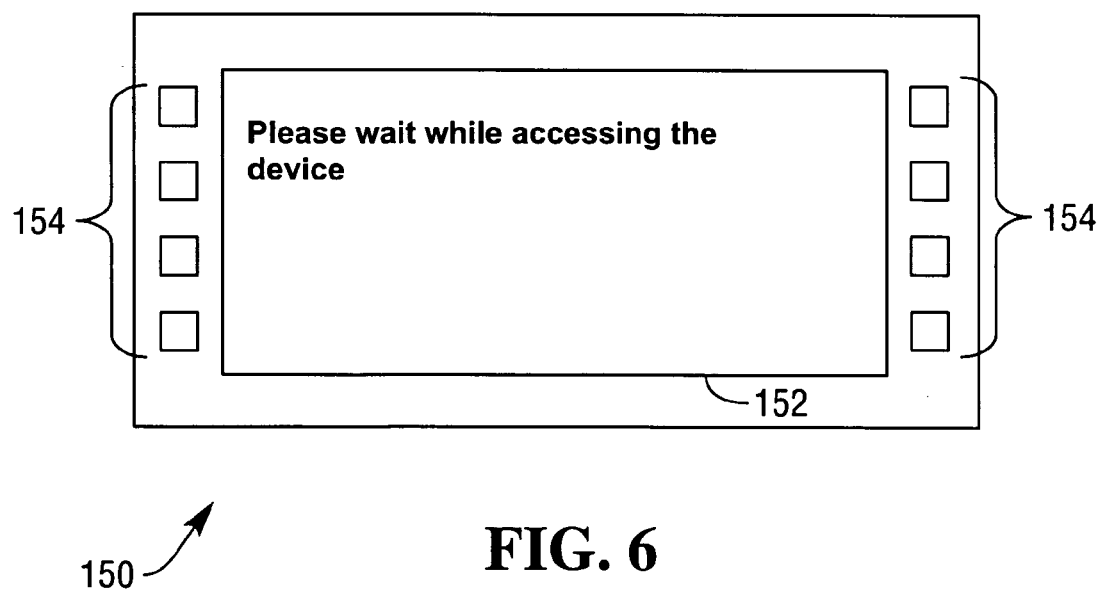

An embodiment of the present invention will now be described, by way of example only, with reference to the following drawings, in which:

FIG. 4 is a flowchart illustrating steps involved in converting the document of FIG. 2 into a second format, according to one embodiment of the present invention;

FIG. 5 illustrates a document created using the steps illustrated in FIG. 4; and FIG. 6 illustrates a second type of ATM operator panel rendering the document of FIG. 5.

DETAILED DESCRIPTION

Figure 1:
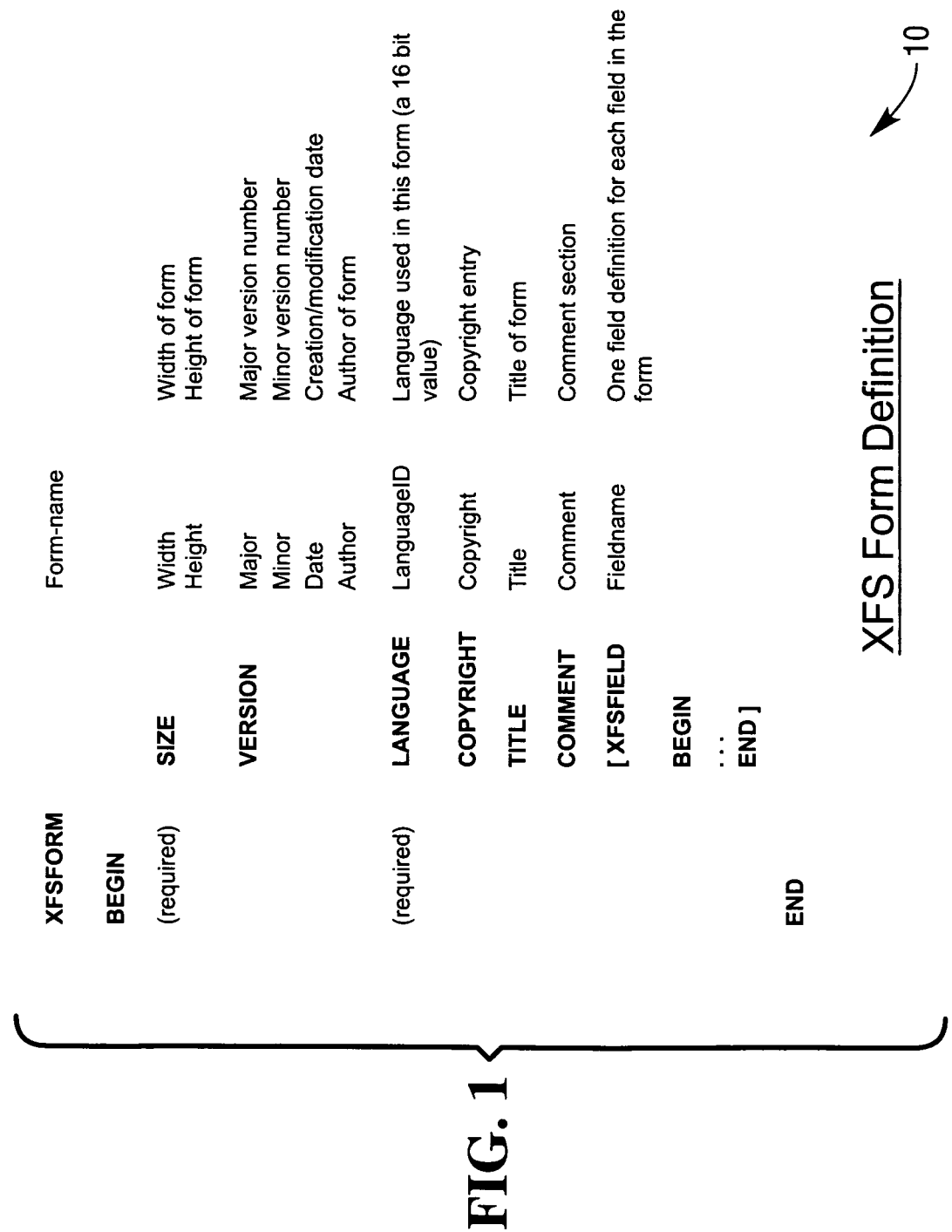
FIG. 1 is a prior art table illustrating the definition of a CEN-XFS Form in accordance with CWA 14050—Extensions for Financial Services (XFS) interface specification—Release 3.03.
Figure 3:
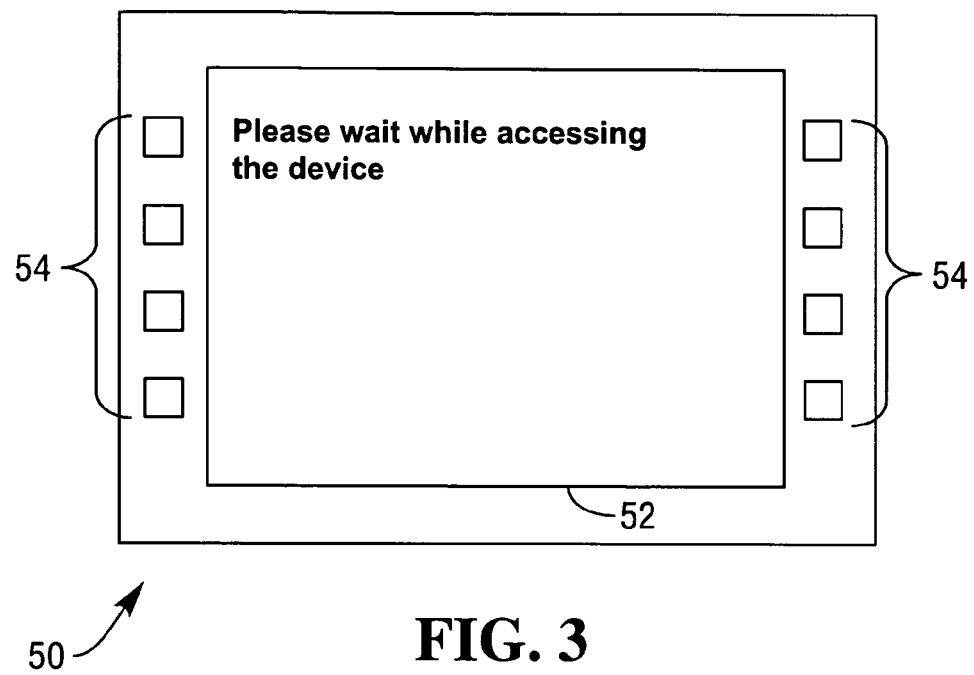
FIG. 3 illustrates a first type of ATM operator panel rendering the document of FIG. 2.

Reference is first made to FIG. 2, which illustrates a document 20 (in the form of an XFS Form) in a first format, and FIG. 3, which illustrates an ATM operator panel 50. The particular XFS Form 20 illustrated in FIG. 2 is for use with the panel 50.

The XFS Form 20 is entitled "enBusOpPleaseWait", as shown in a title attribute 22, and is configured for use with a display size of thirty-two characters by sixteen characters, as shown in size attribute 24. The form has two main XFS fields, one called "Information1" 26, the other called "Information2" 28.

The "Information1" field 26 comprises a plurality of attributes. These attributes include: a content type attribute 30 (which is text in this example), a text size attribute 32 (which is thirty-two characters wide and one character high in this example), a text location attribute 34 (which is at the left-most co-ordinate on the width of the display and six lines down), and an initial value attribute 36 (which is "Please wait while accessing" in this example).

The "Information2" field 28 is very similar to the "Information1" field 26. The only differences are: (i) the value of the location attribute 44 is different (one line below that of the "Information1" field 26); and (ii) the value of the initial value attribute 46 is also different (the text is "the device" in this example).

When this "enBusOpPleaseWait" XFS Form 20 is loaded into an ATM and accessed by a service provider (a software component) for the panel 50, then the service provider parses the Form 20 and renders the text "Please wait while accessing the device" on a display 52 in the panel 50 as shown in FIG. 3. The display 52 can render thirty-two characters in a row, and sixteen characters in a column. The display 52 also has two columns of programmable keys 54. The function performed by one of these keys 54 depends on the particular screen being displayed, as indicated by the text presented in alignment with that key 54.

The panel 50 is typically used by an authorized person (member of bank staff, customer engineer, replenishment agent, or the like) when performing diagnostic, maintenance, or replenishment operations. The panel 50 is not typically used by a customer of the ATM.

On a typical ATM there may be hundreds of different Forms, each Form being used to provide information either on the rear operator panel 50, a journal printer (not shown), or a receipt printer (not shown).

When Forms, such as Form 20, are to be used on an ATM having a display that can render a different number of characters than thirty-two by sixteen, then the Form 20 has to be converted. There may also be other changes that are required. For example, the text may have to be presented on more lines than in Form 20.

A method of implementing this conversion will now be described with reference to FIG. 4, which is a flowchart 60 illustrating one embodiment of the present invention, and FIG. 5, which is a listing of an XFS Form 80 created using the steps illustrated in FIG. 4.

The method may be implemented by a general purpose computer executing a computer program having instructions for performing the steps of the flowchart 60.

In FIG. 4, the first step (step 62) is for the computer program to access the XFS Form 20 to be converted. A user of the program may use a graphical user interface to point to the location of the XFS Form 20 in a directory structure, or the user may load the XFS Form 20 file into a predefined directory.

The program then prompts the user (step 64) to enter details about the type of Form to be created. The program may provide predefined Form types, for example, one Form type used by a first vendor, another Form type used by a second vendor, and such like. The Form types may correspond to those used by well-known ATM vendors, such as NCR Corporation (trade mark), Diebold Corporation (trade mark), Wincor Nixdorf AG (trade mark), and the like. If the user does not wish to select a Form type associated with a particular vendor, then the user can select individual parameters, such as (i) the size of the display that will be used, for example, forty characters by twelve characters, eighty characters by forty characters, or the like; (ii) the reference scheme used for the upper left location on a display, for example, "0,0", or "1,1"; and such like. The program may also prompt the user to enter details about the version of the CEN-XFS standard to be converted from and/or to (for example, NCR XFS v2.02 to Diebold XFS v3.02).

In this example, the newly-converted Form will be used in conjunction with a display having a width of forty characters and a height of twelve characters. The upper left hand location will be referenced as "1,1". The user selects these parameters using a drop-down menu on a graphical user interface.

Once the program can access the XFS Form 20, and the conversion parameters have been entered (either individually or by selecting a predefined Form type), the program then reads (step 66) the XFS Form 20, and parses (step 68) the contents of the XFS Form 20.

When the program parses the XFS Form 20, it ascertains (step 70) for each attribute (for example, size attribute 24) whether that attribute is correct (for example, having the correct value and format) for the type of Form to be created.

If the attribute is correct (step 72), then it is copied to a corresponding line in a new XFS Form 80 (see FIG. 5). For example, the title attribute 82 is unchanged from the title attribute 22 of XFS Form 20.

If the attribute is incorrect, then the program converts the incorrect attribute to a new attribute consistent with the conversion parameters (step 74), and copies the new attribute to a corresponding line in the new XFS Form 80. For example, because the display for which the XFS Form 80 is intended is wider and shorter than display 52, the program converts the size attribute 24 from "32,16" to "40,12". Similarly, because the upper left location is referenced as "1,1" rather than "0,0", the program converts the text size attribute 32 to that shown for the text size attribute 92. The program also converts the text location attributes 34,36 to new text location attributes 94,96 because of the change in the reference scheme.

If there is a substantial change in the number of characters available (in either the width or the height) then the program may also change how the text is displayed. For example, if many lines of text are to be displayed using this Form 80, then the program may reduce the spacing between lines so that the text will fit onto one screen of the display. In this example, the program has converted the initial value attributes 36,46 to new initial value attributes 98,99, so that part of the text ("the") from initial value attribute 46 has been moved to new initial value attribute 98.

When all of the attributes have been copied or converted to the new XFS Form 80 (step 76), then the program saves the XFS Form (step 78) using either the name of the title attribute 82, or a name entered by the user.

This new XFS Form 80 can be loaded onto an ATM having a rear operating panel 150 with a display 152 having forty by twelve characters. When this new XFS Form 80 is interpreted by a service provider for the display 152 then the text presented is as shown in FIG. 6. The operating panel 150 includes programmable keys 154. It is worth noting that when the program is converting a Form, the program may also have to adjust the spacing between lines to ensure that text from the newly-created Form 80 aligns with corresponding programmable keys 154 on the panel 150.

Various modifications may be made to the above described embodiment within the scope of the present invention. For example, the Form may be rendered on printable media (such as thermal paper) rather than a display. In an ATM, the printable media may be printed on a receipt printer, a journal printer, a statement printer, a passbook printer, or the like.

In other embodiments, the documents may be other than CEN-XFS Forms.

In other embodiments, the steps of method 60 may be performed in a different order to that described; for example, the program may prompts the user (step 64) to enter details about the type of Form to be created prior to accessing the Form (step 62).

In other embodiments, the documents may not be text files, for example, the documents may include graphics.

The attributes listed in the above embodiment are just a small selection from the many different attributes that are available, in other embodiments, different attributes may be converted than those described above, for example, a language attribute.

What is claimed is:

1. A method of converting a document from a first XFS Forms format which complies with a CEN-XFS standard to a second XFS Forms format which complies with the CEN-XFS standard and which second XFS Forms format is different from the first XFS Forms format, the method comprising steps of:
   accessing format parameters, the parameters including desired rendering parameters for rendering the document using a computer system based upon rendering capabilities of the computer system;
   reading from the document information in the first XFS Forms format which complies with the CEN-XFS standard;
   parsing the information from the document to detect attributes and text, the attributes including predetermined rendering parameters for rendering the document;
   identifying any detected attributes not consistent with the accessed format parameters, including determining that at least one of the desired rendering parameters is different from a corresponding one of the predetermined rendering parameters;
   converting any identified attributes not consistent with the accessed format parameters into attributes consistent with accessed format parameters, including converting the one predetermined rendering parameter to the one desired rendering parameter; and
   creating a converted document in the second XFS Forms format which complies with the CEN-XFS standard, wherein all attributes of the converted document conform to the accessed format parameters for rendering the document using the computer system.

2. A method according to claim 1, wherein the step of accessing format parameters includes receiving one or more parameters selected by a user via a graphical user interface.

3. A method according to claim 1, wherein the format parameters indicate dimensions of media on which the text is to be rendered.

4. A method according to claim 1, further comprising steps of splitting the converted document into multiple files, and saving each of the multiple files with a different filename, the filename being derived from part of the document.

5. A computer program comprising program instructions for implementing steps according to claim 1, wherein the computer program is embodied on a record medium.

6. A method of converting a document complying with a first implementation of a CEN-XFS standard for a first type of self-service device to a second implementation of the CEN-XFS standard for a second type of self-service device which is different from the first type of self-service device, the method comprising steps of:
   reading from the document information complying with the first implementation of the CEN-XFS standard for the first type of self-service device;
   parsing the information from the document to ascertain text and position information for rendering the document using the first type of self-service device;
   converting the position information to a format used by the second implementation of the CEN-XFS standard for rendering the document using the second type of self-service device which is different from the first type of self-service device; and
   creating a new document comprising the ascertained text and the converted position information so that the second type of self-service device operating according to the second implementation of the CEN-XFS standard is operable to render the text.

7. A computer program comprising program instructions for implementing steps according to claim 6, wherein the computer program is embodied on a record medium.

8. A method according to claim 6, wherein (i) the first type of self-service device comprises a first type of self-service display, and (ii) the second type of self-service device comprises a second type of self-service display which is different from the first type of self-service display.

9. A method according to claim 6, wherein (i) the first type of self-service device comprises a first type of self-service printer, and (ii) the second type of self-service device comprises a second type of self-service printer which is different from the first type of self-service printer.

10. A method of converting a document from a first XFS Forms format to a second XFS Forms format which is different from the first XFS Forms format, the method comprising steps of:
   receiving user entry of rendering parameters based upon rendering capabilities of a computer system;
   reading from the document information in the first XFS Forms format;
   parsing the information from the document to detect attributes and text, the attributes including predetermined rendering parameters for rendering the document;
   determining that at least one of the predetermined rendering parameters is inconsistent with the rendering capabilities of the computer system;
   converting inconsistent predetermined rendering parameters to corresponding rendering parameters entered by the user; and creating a converted document in the second XFS Forms format based upon inconsistent predetermined rendering parameters which have been converted to corresponding rendering parameters entered by the user, wherein both the first XFS Forms format and the second XFS Forms format comply with CEN-XFS standard for Forms.

11. A computer program comprising program instructions for implementing steps according to claim 10, wherein the computer program is embodied on a record medium.

12. A method according to claim 10, wherein the step of receiving user entry of rendering parameters based upon rendering capabilities of a computer system comprises receiving the user entry of rendering parameters individually from the user via a graphical user interface.

13. A method according to claim 10, wherein the step of receiving user entry of rendering parameters based upon rendering capabilities of a computer system comprises receiving the user entry of rendering parameters as a selection of a predefined Form type from the user via a graphical user interface.

14. A method according to claim 10, wherein the rendering parameters received from the user indicate dimensions of media on which the text is to be rendered.

15. A method according to claim 10, wherein (i) the first XFS Forms format is associated a first type of self-service display, and (ii) the second XFS Forms format is associated a second type of self-service display which is different from the first type of self-service display.

16. A method according to claim 10, wherein (i) the first XFS Forms format is associated a first type of self-service printer, and (ii) the second XFS Forms format is associated a second type of self-service printer which is different from the first type of self-service printer.

* * * * *